Jan. 12, 1965 W. BOORMAN 3,165,596

PHONOGRAPH MONAURAL-BINAURAL SWITCHING DEVICE

Filed Dec. 3, 1959

INVENTOR

Wetherby Boorman

BY Townsend and Townsend attorneys 3,165,596
Patented Jan. 12, 1965

3,165,596
PHONOGRAPH MONAURAL-BINAURAL SWITCHING DEVICE

Wetherby Boorman, 132 San Benito Ave., San Bruno, Calif.

Filed Dec. 3, 1959, Ser. No. 857,051
6 Claims. (Cl. 179—100.4)

This invention relates to a phonograph record actuated switching device.

Stereophonic recording on phonograph disks at the present time employs a groove having two separate recording tracks displaced 45° from each other. The recording transducer employs a needle which actuates the electrical transducer on two respective axes so as to discretely sense each of the tracks. Since these two tracks are 45° displaced from one another and each of the directions of sensitivity of the needle is 22½° displaced from the axis of mechanical action on a monaural record it is necessary to electrically switch the transducer elements into a parallel circuit in order to use the same transducer for monaural reproduction. Ordinarily this is done by employing a switch which is connected to the output lines of the transducer so that the two segments of the transducer are each separately fed to two amplifiers when the transducer is actuated for reproducing stereophonic or binaural source material. The two output lines are connected in parallel in order to reproduce a monaural or standard recording. This necessarily creates an additional switching function when the records are intermixed which causes some inconvenience particularly in automatic record players.

It is the principal object of this invention to provide a record actuated switching device which may be mounted either on an automatic record changer or a simple turntable.

A feature and advantage of this device is that the record itself will cause the switching function so as to condition the circuit to the transducers for the appropriate monaural or binaural reproduction.

Another object of this invention is to provide a conductive strip mounted on the record and a sensing brush mounted on or adjacent the turn-table in such a way that when the record is placed in playing position on the turn-table the brushes will sense a closed circuit through the conductive strip on the record to cause the circuit to condition itself for playing of the appropriate monaural or binaural recording.

A further object of this invention is to provide a resetting device which is actuated by an appropriate mechanism either incorporating the tone arm or the devices normally used in automatic record players for re-setting the tone arm to home position which will re-set the transducer switching apparatus to a normal position at the termination of each record.

Another feature and advantage of this invention is that the presence or absence of a single monetary sensing of a conductive spot prior to the playing of the record will cause the automatic switching device to remain either in its home position or to be moved to the alternative position for the entire length of the playing of the program material on the record.

Other objects of the present invention will become apparent upon reading the following specification and referring to the accompanying drawings in which similar characters of reference represent corresponding parts in each of the several views.

Figure 1:
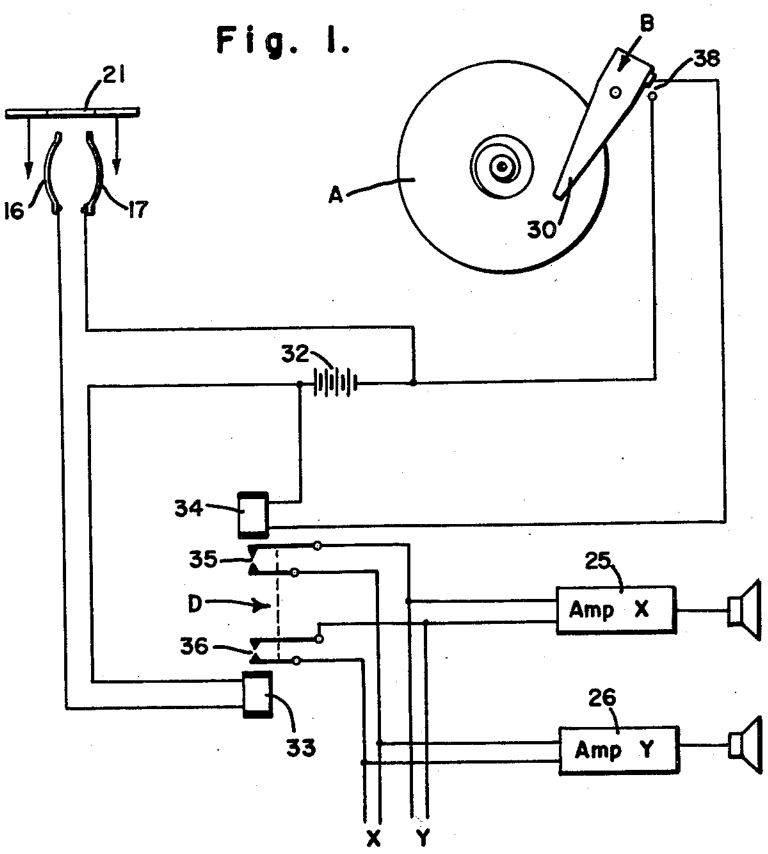
FIG. 1 is a partiallly diagrammatic and partially schematic view showing the principal embodiment of the invention.
Figure 2:
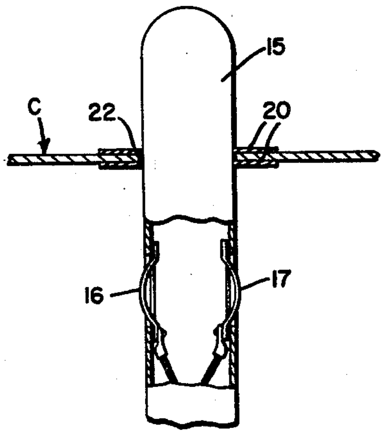
FIG. 2 is an enlarged cross-sectional view showing a portion of a record mounted on the stem of a phonograph turn-table with the brush means mounted in the stem.

In the principal embodiment of the invention a phonograph turn-table generally indicated at A having a tone arm B is arranged with a stem 15 having a pair of brushes 16 and 17 mounted therein.

A phonograph record generally indicated at C may be provided with a pair of annular conductive strips 20 mounted on the upper and lower face of the record hole 21 or may be provided with a cylindrical conductive strip 22 mounted on the inner wall of record hole 21.

Sensing brushes 16 and 17 are arranged to mutually engage conductive strips 20 or 22 as the record slides down stem 15 over the brushes. This creates a momentary closed circuit between the two brushes which is arranged to actuate a bi-stable or flip-flop switching device which in turn is connected to switch a pair of amplifiers 25 and 26 for receipt of either separate or combined signals from the transducer 30 mounted on tone arm B.

Brushes 16 and 17 are connected in series with a battery or other source of power 32 and a solenoid 33 of a bi-stable relay D. Relay D also includes a solenoid 34. Solenoids 33 and 34 are arranged to operate two sets of relay contact points 35 and 36. Contact points 35 and 36 will both open when solenoid 33 is energized and will close when solenoid 34 is energized. Relay contact points 35 and 36 are of the type that will retain or remember their position until energized by the appropriate solenoid in the opposite direction.

By this circuit solenoid 33 is energized when a phonograph record C with the appropriate conductive marking 20 or 22 is placed over stem 15 so that conductive strips 20 or 22 make contact between brushes 16 and 17.

A pair of switch contact points 38 is provided in conjunction with tone arm B in an arrangement so that the switch will close momentarily when the arm is moved to its home or rest position beside the record as shown in FIG. 1.

Switch contact points 38 are arranged in series with power source 32 so as to energize solenoid 34 to cause relay contact points 35 and 36 to open. Thus after the termination of a record and after tone arm B has moved back to its home position switch contact points 38 will energize solenoid 34 and cause relay D to return to its home position.

Transducer 30 is of the type having two electrically separate transducers which are each connected to a pair of leads indicated at X and Y in FIG. 1. The pair of leads X and Y are directly connected to amplifiers 25 and 26 so that the signal from the X component of transducer 30 may be amplified and reproduced by amplifier 25 and the signal from the Y component of transducer 30 may be energized and reproduced by amplifier 26. This is the electrical connection for the transducers when reproducing stereophonic records.

For reproducing monaural records it is necessary to connect each one of the wires from the X component of transducer 30 with the comparable wire from the Y component. By this means the input to each of the amplifiers 25 and 26 will be the same each sharing the output from both the X and Y components of transducer 30.

To accomplish this switching function the identical wires of each of the components X and Y are connected to relay contact points 35 and 36 respectively so that when solenoid 33 is actuated to cause relay contact points 35 and 36 to close the circuit will be in a condition for reproducing monaural recording and when relay D is in its home position, that is when relay contact points 35 and 36 are open, the circuit will be in condition for reproducing stereophonic or binaural recording.

It is believed obvious that by merely switching the leads to solenoid 33 and solenoid 34 that the exact opposite switching can be arranged, that is, the normal position of relay D will provide for the reproduction of monaural recording and the activated condition will provide for the reproduction of stereophonic recording.

In operation of the device after tone arm B is moved to the home position switch contact points 38 are open thus causing both solenoids 34 and 35 to be unenergized. However, when the tone arm was moved to the home position, switch 38 momentarily closed to cause solenoid 39 to move relay D to its normal condition. Should a conventional record be placed on the record player, that is a record without conductive markings 20 or 22, the circuit would remain in its normal condition because there would be nothing that would cause a closed circuit between brushes 16 and 17. However, should it be desired to play a stereophonic record the record would first be provided with a conductive marking 20 or 22. This could be done by gluing or otherwise fastening a conductive ring 20 around the bottom of the record or a little conductive cylinder 22 on the inner wall of hole 21. When such a record is placed on stem 15 the conductive strip will close the connection between brushes 16 and 17 as the record moves down on the stem onto turn-table A. This momentarily makes a working contact between brushes 16 and 17 causing relay D to shift to its energized or second position thus conditioning the circuit for the opposite type of reproduction. After the record has terminated tone arm 30 is moved back to its home position wherein contact points 38 are momentarily closed thus causing solenoid 34 to be energized and relay D to return to its normal or home position.

It can be seen, therefore, that by the operation of this device that each record of a stereo or monaural class as the choice may be is marked with the appropriate conductive markings. Thereafter the circuit will automatically condition itself so that the transducer is connected in the appropriate manner for playing the record.

It is believed obvious that while switch 38 has been shown integrally mounted on tone arm B that the switch contact points 38 could be any of those that are conventionally used with tone arms. It may even comprise a parallel operation of the switch which normally causes the next succeeding record to be moved on a record player or may be a switch which will cause the turn-table to stop after the tone arm is moved to the home position. There are many such switches available and all would appear to be completely adequate for this device.

Figure 3:
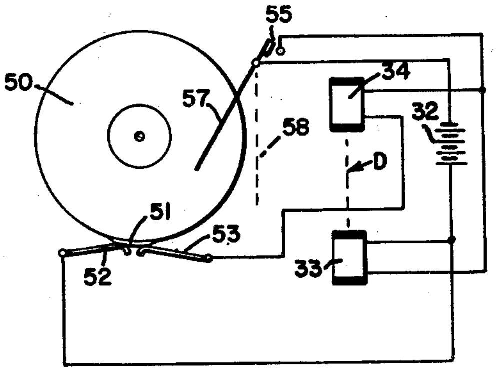
FIG. 3 is an alternative embodiment of the invention showing the conductive strip mounted on the peripheral edge of the record and showing a pair of brushes adapted to make contact with the conductive strip on the edge of the record.

It is also believed apparent that the position of brushes 16 and 17 need not necessarily be in the stem but may be any place near the record where the marking on the record can be engaged by the brushes. For example, as seen in FIG. 3, a phonograph record 50 is provided with a conductive marking on its peripheral edge as indicated at 51. A pair of brushes 52 and 53 are mounted in a position to contact the rim of the record. Thus each time the record rotates to a position where conductive point 51 is in alignment with the two brushes 52 and 53 the electrical circuit between the brushes will close. The brushes are formed in a circuit with a relay D identical to relay D of FIG. 1 and having contact points 35 and 36 which are not shown in order to avoid duplication of parts.

A resetting switch 55 is mounted in combination with the tone arm 57 so that when the tone arm is in its home position, as indicated by dotted line 58, switch 55 will be open. Thus at all times while the tone arm is in the home position solenoid 34 will be energized so that the relay will not reset even though there is a conductive strip 51 on the record on the turn-table. Relay D will only reset after tone arm 57 is moved into playing position. It is believed that this particular type of conductive mounting on the peripheral edge of the record would be quite suitable for single play record turn-tables.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. In a phonograph of the type having a turn-table, a tone arm movable from an initial position adjacent the turn-table to an operating position in engagement with a phonograph record on the turn-table, a transducer on the tone arm having first and second components each adapted to produce a separate signal from phonograph records provided with multi-channel recordings within a single groove and to establish identical signals from records having a single channel within each groove the combination of; first switch means connected to each component and operable to move to a first condition to connect said components together and to a second condition to disconnect the components from interconnection, phonograph records for use with said phonograph, conductive means mounted on said records, second switch means adjacent said turn-table and engageable with the conductive means on the record to cause the second switch means to close, means connected to be operated by said second switch means to move said first switch means to one of said first and second conditions when said second switch means is closed, third switch means connected to close with movement of said tone arm to the initial position, and means connected to be operated by said third switch means to move said first switch means to the other of said first and second positions when said third switch means is closed.

2. A device according to claim 1 and wherein said first switch means comprises a pair of brushes mounted in the stem of the turn-table and the conductive means on the records is located at the hole in the center of the record.

3. A device according to claim 1 and wherein said conductive means is mounted on the edge of the record and said second switch means comprises a pair of brushes mutually engageable with the edges of said record.

4. In a phonograph the combination of a stereophonic transducer having a first and second section, a bi-stable relay having switch contacts operable to move to a first condition when the relay is pulsed by a first signal and to a second condition when said relay is pulsed by a second signal, a pair of amplifiers, said switch contacts connected to said transducers to connect the two sections of said transducers each to one of said amplifiers when said switch contacts are in one of the two conditions of operation and to connect both sections to both amplifiers when said switch contacts are in the opposite condition of operation, phonograph record means for use with said phonograph, conductive means mounted on said phonograph records for use with said phonograph, means to sense the presence of the conductive members on said phonograph and to produce therefrom said first signal, means connecting said first signal to said relay, means to provide said second signal after each termination of play of records on the phonograph, and means to connect said second signal to said relay whereby one of said first and second signals is operative to cause each of the first and second sections of said transducer to be separately connected to one of the two amplifiers and the other of said first and second signals is operative to cause the first and second section of said transducer to be connected to both of said amplifiers.

5. A switching device for use in phonographs of the type having a transducer having two output sections and a pair of amplifiers in which the two output sections of the transducer are to be alternatively connected separately to each of said amplifiers and jointly to each of said amplifiers, comprising at least one conductive marking on phonograph records to be used with said phonograph, sensing means to electrically sense the presence of conductive markings on the phonograph records when the records are placed in position for playing on the phonograph, a bi-stable relay, said sensing means connected to said bi-stable relay to move said relay to one of the two stable states when a conductive marking is sensed by said sensing means, said bi-stable relay having contact connecting said transducer separately to each amplifier when in one of said two stable states, contacts connecting said sections of said transducer jointly to said amplifiers when said bi-stable relay is in the second of the two stable states, means connected to said bi-stable relay to cause said bi-stable relay to move to the second of the two stable states, and means connected to said phonograph operative to actuate said latter means upon completion of the playing of a record on said phonograph.

6. In a phonograph the combination of a stereophonic transducer of the type having a first and second section, a bi-stable relay having switch contacts operable to move to a first condition when the relay is pulsed from a first signal and to a second condition when said relay is pulsed from a second signal, a pair of amplifiers, said switch contacts connected to connect the two sections of said transducers each to one of said amplifiers when said contacts are in one of two conditions of operation and to connect both sections to both amplifiers when said switch contact points are in the opposite condition of operation, an electrically conductive member mounted on phonograph records for use with said phonograph, brush means connected to said relay positioned to contact the conductive member on a phonograph record when the phonograph record is positioned for playing on the phonograph to provide the first signal, second switch means connected to said relay to provide said second signal, and means to actuate said second switch means at the termination of play of a phonograph record.

References Cited in the file of this patent

UNITED STATES PATENTS

| | | |
|---|---|---|
| 2,864,897 | Kaar | Dec. 16, 1958 |
| 2,939,714 | Dennis | June 7, 1960 |

OTHER REFERENCES

"Ready For Stereo?" Radio-Electronics, December 1958, pages 50 and 51.